2,942,006

PREPARATION OF MALEIC ANHYDRIDE BY AZEOTROPIC DISTILLATION OF MALEIC ACID

Mitchell Becker, Plainview, N.Y., assignor, by mesne assignments, to Scientific Design Company, Inc., a corporation of Delaware No Drawing. Filed July 1, 1957, Ser. No. 668,863

5 Claims. (Cl. 260—346.8)

This application is concerned with a process for the dehydration of maleic acid to produce maleic anhydride. Further, it is concerned with a process in which the maleic acid is introduced into a dehydration zone as an aqueous solution. More particularly, the invention is concerned with the utilization of anisole, methyl phenyl ether, as an entraining agent for the removal of either or both solvent and combined water from maleic acid and aqueous solutions thereof.

Maleic anhydride can be produced by the vapor phase oxidation of benzene. In such a process ordinarily the maleic anhydride is obtained by scrubbing the exit reaction products to form an aqueous solution of maleic acid which is then dehydrated to produce maleic anhydride. Various organic liquids, for example, xylene, have been utilized as entraining agents to effect the dehydration of maleic acid to maleic anhydride. Prior to the present invention it has been considered desirable and even necessary to utilize organic liquids having a maximum boiling point of about 145° C. in order to minimize the isomerization of maleic acid to fumaric acid, which isomerization is known to occur at elevated temperatures.

Further, in the commercial utilization of an organic liquid such as xylene for the dehydration of maleic acid, and particularly aqueous solutions thereof, there has been observed the problem of loss of maleic acid or maleic anhydride as overhead. It will be realized that in the production of large quantities of maleic anhydride that the consistent loss of even a small portion of the desired product is uneconomical and the elimination of such loss is highly desirable.

It is a feature of the present invention that utilization of anisole as an entraining agent for the removal of solvent water or combined water from maleic acid or aqueous solution thereof, produces maleic anhydride and results in a marked decrease in the amount of maleic acid or anhydride lost as a result of being carried overhead. The isomerization of maleic acid to fumaric acid is minimized and a comparatively lesser amount of entraining agent per unit of water removed is utilized than with heretofore commercially utilized entrainers.

The present invention, in one embodiment, concerns a process for the dehydration of maleic acid comprising contacting maleic acid with anisole at a temperature of at least about the boiling point of anisole, separating water and anisole vapors therefrom and recovering the thus-produced maleic anhydride.

In a further embodiment, the present invention is concerned with a process for the production of maleic anhydride comprising contacting an aqueous solution of maleic acid at a temperature of at least about the boiling point of anisole in the presence of said aqueous solution, separating the water and anisole vapors therefrom to remove solvent water and combined water and recovering the thus-produced maleic anhydride.

More particularly, the present invention is concerned with a process for the production of maleic anhydride comprising introducing an aqueous solution of maleic acid into a stripping column wherein there is maintained an atmosphere of anisole vapors at a temperature of at least about the boiling point of anisole in the presence of said aqueous solution, removing overhead from said column a mixture of anisole and water vapors, condensing said vapors, separating the resulting aqueous solution from the anisole, returning the separated anisole to the column and removing from the bottom of said column substantially pure maleic anhydride.

As described above, in commercial practice, there is obtained an aqueous solution of maleic acid. Generally, this solution is of a strength in the range of from 30% to 50% maleic acid and the present invention is particularly applicable to the production of maleic anhydride from such solutions. However, it will be realized that solutions of lesser or greater concentration can be treated according to the present invention. Utilizing the present invention, an aqueous solution of maleic acid is introduced into a stripping column wherein there are maintained anisole vapors at a temperature of the boiling point of anisole in the presence of the particular aqueous maleic acid solution utilized. Upon contacting these vapors both the solvent water and the combined water of the maleic acid are removed as overhead together with anisole vapors. These vapors are condensed, the aqueous and organic phases separated and the anisole, or organic layer, returned to the stripping column.

After removal of the solvent and combined water, the resulting maleic anhydride can be removed from the system as a bottom product of the stripping column.

The use of anisole as thus described results in recovery as maleic anhydride of a very high proportion of the maleic acid introduced in the aqueous solution. Further, such use produces very little loss of maleic product as a result of being carried overhead with the water and/or anisole vapors. Further, the isomerization of maleic acid to fumaric acid is minimum. It is surprising that this is so in view of the high boiling point of anisole as compared to previously commercially used entraining agents such as xylene. Additionally, it is to be noted that the minimum amount of anisole needed to remove a unit of solvent water and/or combined water is less than for previously known entraining agents such as xylene.

The present invention is illustrated by, but not limited to, the following preferred embodiments.

*Example 1*

Into a column having thirteen theoretical plates which column is equipped with a reflux condenser, a separator and means for returning the separated organic layer to the column, there is fed a 40% aqueous solution of maleic acid. There is maintained in the column vapors of anisole. The pressure at the top of the column is maintained at 660 mm. Hg and the condensate temperature is maintained at 50° C. Overhead vapor temperature is maintained at 105° C.

The aqueous solution is introduced at such a rate that the water introduced as either combined or solvent aqueous solution is equal to that removed as overhead. After operation of the column for a sufficient period of time to allow steady state conditions to be attained, there is obtained as bottoms of the column the desired product, maleic anhydride. The maleic anhydride recovered comprises 99.35% of the maleic acid introduced into the column as aqueous solution.

The overhead of the column comprises the solvent and combined water, anisole and about 0.65% of the maleic acid introduced in the aqueous solution.

When xylene is substituted for the anisole used in the foregoing example, there is obtained in the overhead 3% of the maleic acid introduced and 97% is obtained as bottoms. With respect to the maleic acid carried out the top of the column, when utilizing anisole and xylene respectively, i.e. 0.65% vs. 3%, there is over 4-fold advantage utilizing anisole.

Further, it is to be noted that per mol of maleic acid fed to the column it requires approximately 4.6 mols of xylene to be removed as overhead, whereas utilizing anisole as the entrainer there is required only approximately 3.6 mols per mol of maleic acid. Thus, utilizing xylene it is required that approximately 28% more entrainer be handled per unit of maleic acid introduced into the column for dehydration or over 30% more material per unit of maleic anhydride obtained as bottoms.

It will be realized that the dehydration of an aqueous solution of maleic acid can be accomplished in a batch still as compared to the column described in Example 1. This is illustrated in Example 2.

Example 2

An aqueous solution obtained by passing the exit products from a vapor phase oxidation of benzene through a water scrubber and containing about 15% maleic acid is charged to a batch still together with approximately ¼ volume anisole. The still is equipped with a distillation column and the solvent water and combined water are removed as overhead of the column together with anisole. There is removed in the overhead 0.5% of the starting maleic acid.

Substitution of approximately the same amount of xylene for the anisole utilized in the foregoing example results in the removal of 1.5% of the starting maleic acid as overhead.

It is to be noted that in comparing the use of anisole and xylene in such batch operation there is a 3-fold advantage (i.e. 1.5/0.5) in favor of anisole with respect to the amount of maleic acid lost in the overhead.

While the foregoing examples have been concerned with the dehydration of aqueous solutions of maleic acid, which is the usual material to be handled in commercial practice, it will be realized that the present invention is equally applicable to the dehydration of maleic acid per se. In such processes, the introduction of maleic acid into, for example, the stripping column or batch still, can be accomplished in various forms, such as, for example, an anisole solution or in the liquid or solid state, the latter two obviously presenting the mechanical handling difficulties not encountered when the maleic acid is introduced as a solution.

A process of the present invention utilizing anisole can be operated at atmospheric pressure, reduced pressure or superatmospheric pressure. Similarly, the process can be operated in either batch or continuous fashion. As indicated above, the process can be utilized in conjunction with from 5% to 80% aqueous solution of maleic acid as starting materials. Excellent results are obtained utilizing aqueous solutions of strengths in the range of 25% to 60% and it is preferred to utilize aqueous solutions of strengths in the range of 30% to 50%.

It will be realized that the process can be operated under a wide variety of conditions, such that the molar ratio of water removed as overhead per mol of entrainer removed as overhead can vary over a wide range. Of course, the lower limit of such ratio is set by economic conditions. In general, it is desirable that the process be operated so that the ratio is at about 3 or less; preferably the ratio is about 1 or less.

In view of the foregoing discussions, variations and modifications of the invention will be apparent to one skilled in the art and it is intended to include within the invention all such variations and modifications except as do not come within the scope of the appended claims.

What is claimed is:

1. A process for the dehydration of maleic acid comprising contacting maleic acid with anisole at a temperature of at least about the boiling point of anisole, separating water and anisole vapors therefrom and recovering the thus-produced maleic anhydride.

2. A process for the production of maleic anhydride comprising contacting an aqueous solution of maleic acid at a temperature of at least about the boiling point of anisole in the presence of said aqueous solution, separating the water and anisole vapors therefrom to remove solvent water and combined water and recovering the thus-produced maleic anhydride.

3. A process for the production of maleic anhydride comprising introducing an aqueous solution of maleic acid into a stripping column wherein there is maintained an atmosphere of anisole vapors at a temperature of at least about the boiling point of anisole in the presence of said aqueous solution, removing overhead from said column a mixture of anisole and water vapors, condensing said vapors, separating the resulting aqueous solution from the anisole, returning the separated anisole to the column and removing from the bottom of said column substantially pure maleic anhydride.

4. A process of claim 3 in which the aqueous maleic acid solution has a concentration of maleic acid in the range of from about 30% to 50% and in which the molar ratio of water removed as overhead to anisole removed as overhead is at least about 1.0.

5. In a process for the production of maleic anhydride by removal of solvent water and combined water from an aqueous solution of maleic acid by contacting said aqueous solution with water insoluble organic liquid and removing said water and said organic liquid as an azeotropic mixture, the improvement of utilizing anisole as the water insoluble organic liquid whereby the losses of maleic anhydride due to removal with the water are minimized.

References Cited in the file of this patent

UNITED STATES PATENTS

| | | |
|---|---|---|
| 2,166,556 | Spence | July 18, 1939 |
| 2,340,490 | Porter | Feb. 1, 1944 |
| 2,462,444 | Weiss | Feb. 22, 1949 |
| 2,734,854 | Ospenson | Feb. 14, 1956 |

OTHER REFERENCES

Horsley: Anal. Chem., vol. 19, pp. 508–516 (1947).